US012612511B2

(12) United States Patent
McCann et al.

(10) Patent No.: US 12,612,511 B2
(45) Date of Patent: Apr. 28, 2026

(54) FLAME RETARDANT POLYAMIDE-BASED 3D PRINTING EXTRUSION MATERIALS

(71) Applicant: Stratasys, Inc., Minnetonka, MN (US)

(72) Inventors: David McCann, Geleen (NL); Joanna Marguier, Geleen (NL); Sebastian Hörold, Geleen (NL)

(73) Assignee: Stratasys, Inc., Minnetonka, MN (US)

( * ) Notice: Subject to any disclaimer, the term of this patent is extended or adjusted under 35 U.S.C. 154(b) by 359 days.

(21) Appl. No.: 17/639,606

(22) PCT Filed: Sep. 3, 2020

(86) PCT No.: PCT/EP2020/074652

§ 371 (c)(1),
(2) Date: Mar. 2, 2022

(87) PCT Pub. No.: WO2021/043929

PCT Pub. Date: Mar. 11, 2021

(65) Prior Publication Data

US 2022/0332922 A1 Oct. 20, 2022

(51) Int. Cl.

| | |
|---|---|
| ***C08K 5/5313*** | (2006.01) |
| ***B29C 64/118*** | (2017.01) |
| ***B29C 64/153*** | (2017.01) |
| ***B29K 77/00*** | (2006.01) |
| ***B29K 105/00*** | (2006.01) |
| ***B29K 105/06*** | (2006.01) |
| ***B33Y 10/00*** | (2015.01) |
| ***B33Y 70/00*** | (2020.01) |
| ***B33Y 70/10*** | (2020.01) |
| ***C08K 3/016*** | (2018.01) |
| ***C08K 3/22*** | (2006.01) |
| ***C08K 3/32*** | (2006.01) |
| ***C08K 3/40*** | (2006.01) |
| ***C08K 5/00*** | (2006.01) |
| ***C08K 7/14*** | (2006.01) |

(52) U.S. Cl.

CPC .......... *C08K 5/5313* (2013.01); *B29C 64/118* (2017.08); *B29C 64/153* (2017.08); *B33Y 10/00* (2014.12); *B33Y 70/00* (2014.12); *B33Y 70/10* (2020.01); *C08K 3/016* (2018.01); *C08K 3/22* (2013.01); *C08K 3/32* (2013.01); *C08K 3/40* (2013.01); *C08K 7/14* (2013.01); *B29K 2077/00* (2013.01); *B29K 2105/0026* (2013.01); *B29K 2105/06* (2013.01); *B29K 2995/0016* (2013.01); *C08K 2003/2227* (2013.01); *C08K 2003/321* (2013.01); *C08K 2003/328* (2013.01); *C08K 5/0066* (2013.01); *C08L 2201/02* (2013.01)

(58) Field of Classification Search

CPC .......... C08K 5/5313; C08K 3/22; C08K 3/32; C08K 3/40; C08K 7/14; C08K 2003/2227; C08K 2003/328; C08K 5/0066; C08K 3/016; C08K 2003/321; B29C 64/118; B29C 64/153; B33Y 10/00; B33Y 70/00; B33Y 70/10; B29K 2077/00; B29K 2105/0026; B29K 2105/06; B29K 2995/0016; C08L 77/00; C08L 2201/02

See application file for complete search history.

(56) References Cited

U.S. PATENT DOCUMENTS

| | | | | |
|---|---|---|---|---|
| 4,333,121 | A * | 6/1982 | Schwarz | H01H 85/18 361/119 |
| 4,426,549 | A * | 1/1984 | Natwig | H01B 3/441 174/110 V |
| 5,780,534 | A | 7/1998 | Kleiner et al. | |
| 7,294,661 | B2 * | 11/2007 | Martens | C08K 5/5313 524/133 |
| 7,317,044 | B2 | 1/2008 | Monsheimer et al. | |
| 9,745,515 | B2 | 8/2017 | Bateman et al. | |
| 2001/0025116 | A1 | 9/2001 | Kleiner | |
| 2006/0041041 | A1 | 2/2006 | Douais et al. | |
| 2006/0071359 | A1 | 4/2006 | Monsheimer et al. | |
| 2007/0072967 | A1 | 3/2007 | Nass et al. | |
| 2007/0072970 | A1 | 3/2007 | Schneider | |
| 2008/0166496 | A1 * | 7/2008 | Monsheimer | C08K 5/0041 106/287.3 |

(Continued)

FOREIGN PATENT DOCUMENTS

| | | |
|---|---|---|
| CN | 103154110 A | 6/2013 |
| EP | 0699708 A2 | 3/1996 |

(Continued)

OTHER PUBLICATIONS

International Search Report, PCT/EP2020/074652, date of mailing: Oct. 7, 2020, Authorized officer: Graham Russell.

European Search Report for EP Patent Application No. 20192881.9, Issued on Feb. 11, 2021, 3 pages.

International Preliminary Report on Patentability received for PCT Patent Application No. PCT/EP2021/073431, mailed on Mar. 9, 2023, 9 pages.

International Search Report and Written Opinion received for PCT Patent Application No. PCT/EP2020/074652, mailed on Oct. 7, 2020, 10 pages.

International Search Report and Written Opinion received for PCT Patent Application No. PCT/EP2021/073431, mailed on Nov. 19, 2021, 11 pages.

*Primary Examiner* — Jeffrey M Wollschlager
(74) *Attorney, Agent, or Firm* — Faegre Drinker Biddle & Reath LLP

(57) ABSTRACT

The present invention relates to a fire, smoke and toxicity retardant (FST) polyamide thermoplastic mass usable for 3D printing which comprises at least one non-halogenated organic flame retardant in combination with at least one particulate inorganic flame retardant. Moreover, the present invention refers to uses of such FST polyamide thermoplastic mass for 3D printing. The invention further relates to methods of preparing a three-dimensionally shaped product by means of 3D printing based on such FST polyamide thermoplastic mass.

11 Claims, No Drawings

(56) References Cited

U.S. PATENT DOCUMENTS

| | | | | |
|---|---|---|---|---|
| 2009/0030124 | A1* | 1/2009 | Yin | C08K 3/38 524/133 |
| 2011/0059308 | A1* | 3/2011 | Partington | C08J 5/10 428/297.4 |
| 2011/0200784 | A1 | 8/2011 | Agarwal et al. | |
| 2012/0083558 | A1 | 4/2012 | Bayer et al. | |
| 2013/0190432 | A1* | 7/2013 | Krause | C08K 3/22 524/133 |
| 2013/0203910 | A1 | 8/2013 | Zhang et al. | |
| 2013/0217814 | A1* | 8/2013 | Yu | C09K 21/12 524/133 |
| 2014/0141166 | A1 | 5/2014 | Rodgers | |
| 2014/0141168 | A1 | 5/2014 | Rodgers | |
| 2015/0175804 | A1 | 6/2015 | Aepli | |
| 2015/0218374 | A1 | 8/2015 | Thomas et al. | |
| 2016/0009918 | A1 | 1/2016 | Hoerold et al. | |
| 2016/0107337 | A1* | 4/2016 | Acerbo | B33Y 70/00 264/143 |
| 2017/0037198 | A1 | 2/2017 | Bayer et al. | |
| 2018/0119017 | A1 | 5/2018 | Schlosser et al. | |
| 2018/0244899 | A1 | 8/2018 | Sebastian et al. | |
| 2019/0153197 | A1 | 5/2019 | Krause et al. | |
| 2019/0160737 | A1 | 5/2019 | Gabriel et al. | |
| 2019/0344502 | A1 | 11/2019 | Sweeney et al. | |
| 2020/0048414 | A1 | 2/2020 | Qi | |
| 2020/0061906 | A1* | 2/2020 | Nakai | B29C 64/118 |
| 2020/0247995 | A1 | 8/2020 | Marchese et al. | |
| 2021/0040318 | A1 | 2/2021 | Hirano et al. | |
| 2023/0357569 | A1 | 11/2023 | Schillo et al. | |

FOREIGN PATENT DOCUMENTS

| | | | |
|---|---|---|---|
| EP | 0923586 | B1 | 3/2003 |
| EP | 1670862 | B1 | 6/2008 |
| EP | 2902444 | A1 | 8/2015 |
| EP | 2886605 | B1 | 10/2015 |
| EP | 3476898 | A1 | 5/2019 |
| EP | 2438113 | B1 | 7/2019 |
| JP | 2006-104470 | A | 4/2006 |
| JP | 2007-070627 | A | 3/2007 |
| JP | 2008-505243 | A | 2/2008 |
| JP | 2013-538926 | A | 10/2013 |
| JP | 2016-509114 | A | 3/2016 |
| JP | 2018-516288 | A | 6/2018 |
| JP | 2019-001154 | A | 1/2019 |
| WO | 2014/081594 | A1 | 5/2014 |
| WO | 2014/148519 | A1 | 9/2014 |
| WO | 2015/116922 | A1 | 8/2015 |
| WO | 2018/019727 | A1 | 2/2018 |
| WO | 2018/019728 | A1 | 2/2018 |
| WO | 2018/019730 | A1 | 2/2018 |
| WO | 2019/068658 | A1 | 4/2019 |
| WO | 2019/068659 | A1 | 4/2019 |
| WO | WO2019076688 | * | 4/2019 |
| WO | 2019/088014 | A1 | 5/2019 |
| WO | 2019/208741 | A1 | 10/2019 |

OTHER PUBLICATIONS

Malawer et al. "Introduction to Size Exclusion Chromatography", Handbook of Size Exclusion Chromatography and Related Techniques, Second Edition, vol. 91, Chapter 1, 2003, pp. 1-14.

* cited by examiner

FLAME RETARDANT POLYAMIDE-BASED 3D PRINTING EXTRUSION MATERIALS

CROSS-REFERENCE TO RELATED APPLICATIONS

This application is a national stage application under 35 U.S.C. § 371 of PCT/EP2020/074652, filed Sep. 3, 2020, which claims priority to U.S. provisional patent application Nos. 62/896,763, filed 6 Sep. 2019, and 62/978,316, filed 19 Feb. 2020, the entire content of each of which is hereby incorporated by reference in its entirety as if set forth fully herein.

TECHNICAL FIELD

The present invention relates to a fire, smoke and toxicity retardant (FST) polyamide thermoplastic mass (material) usable for 3D printing which comprises at least one non-halogenated organic flame retardant in combination with at least one particulate inorganic flame retardant. Moreover, the present invention refers to uses of such FST polyamide thermoplastic materials for 3D printing. The invention further relates to methods of preparing a three-dimensionally shaped product by means of 3D printing based on such FST polyamide thermoplastic mass.

BACKGROUND

There exists a large variety of commercial products which are at least partly composed of different types of thermoplastic masses. Polyamides such as nylon compositions are used for producing numerous different products.

The mechanical properties of thermoplastic masses, including polyamides, can be strengthened by adding reinforcing materials such as glass fibers (as described in, e.g., US-A 2018/244899) and/or may include with one or more fillers. The usability of most thermoplastic masses, including polyamide thermoplastic masses, however, is often limited by inflammability.

Therefore, it was considered to equip polyamide thermoplastic masses with flame retardants such as phosphorous agents. EP-A 3127937 and US-A 2018/244899 describe flame retardant polyamide thermoplastic masses containing a dialkylphosphinic and/or diphosphinic salts as flame retardants. EP-A 3127937 describes that such flame retardant polyamide thermoplastic masses can even be usable for sensitive uses such as railway components. Even the fire, smoke and toxicity retardant (FST) requirements of industrial norms EN 45545-2 and NFPA 131 are fulfilled. Some compositions may also fulfill the requirements for aerospace applications such as FAR 25.853.

U.S. Pat. No. 7,317,044 describes phosphonate-based flame retardant in the context of nylon compositions.

EP-B 2318460 describes nylon fibers and nylon carpets equipped with a flame retardant composition that preferably contains clay and an inorganic bromine-based compound. EP-B 1576073 notes that it is undesirable to use phosphorous agents and, instead, describes flame retardant compositions containing an inorganic-organic hybrid, which may be clay.

A technical disadvantage of the aforementioned flame retardants is that these may lead to generation of an undesirably high intensity of smoke and may impair surface quality and/or processability. In particular, phosphorous flame retardants such as dialkylphosphinic and/or diphosphinic salts often tend to generate considerable amounts of smoke at very high temperatures. In recent years, 3D printing gained increasing interest in producing products from thermoplastic masses. This makes it even more challenging to prepare products with desirable surface characteristics which maintain mechanical strengths and flame retardability. In particular, reduction of generation of smoke is additionally challenging.

There is still an unmet need to provide polyamide masses suitable for 3D printing applications which may be optionally reinforced, that have concomitantly good surface quality, are flame retardant, and show reduced generation of smoke when heated.

Inventors have surprisingly found that combining a non-halogenated organic flame retardant with a particulate inorganic flame retardant leads to particularly good results with respect to retarding fire, smoke and toxicity of a polyamide thermoplastic mass and thereby obtaining a fire, smoke and toxicity retardant (FST) reinforced or filled polyamide thermoplastic mass particularly well usable for 3D printing.

BRIEF SUMMARY

Accordingly, the present invention relates to a fire, smoke and toxicity retardant (FST) polyamide thermoplastic mass usable for 3D printing which comprises at least one non-halogenated organic flame retardant in combination with at least one particulate inorganic flame retardant. Moreover, the present invention refers to uses of such FST polyamide thermoplastic mass for 3D printing. The invention further relates to methods of preparing a three-dimensionally shaped product by means of 3D printing based on such FST polyamide thermoplastic mass.

DETAILED DESCRIPTION

A first aspect refers to a thermoplastic mass usable for 3D printing comprising, consisting of, or consisting essentially of:

(A) at least one polyamide as component A;

(B) at least one non-halogenated organic flame retardant as component B;

(C) at least one particulate inorganic flame retardant as component C;

(D) optionally one or more reinforcing or filler materials as component D; and (E) optionally one or more polymer additives selected from the group consisting of stabilizers, antioxidants, dyes, pigments, releasing agents, fillers, plasticizers, processing agents, antimicrobial agents, slip agents, antistatics, conductive additives (e.g., metal, carbon, etc.), insulative additives, anti-dripping agents, further flame retardants, and combinations of two or more thereof, as component E.

The person skilled in the art knows a large variety of such additives. For example, a stabilizer may be selected from Nylostab® S-EED®, Hostanox® P-EPQ®, and a combination thereof. A color component may optionally also be introduced via a masterbatch, such as, e.g., comprising black polyamide 6. It will be understood that these components may be included with or without a masterbatch.

As used herein, the term "3D printing" may be understood in the broadest sense as any process that builds a three-dimensional (3D) object from a computer-aided design (CAD) model, from a scan or other information or by 3D drawing/painting or any other means for generating a specific 3D shape. Typically, but not necessarily, 3D printing is performed by successively adding material layer by layer, which may be designated as additive manufacturing. 3D printing may be distinguished from casting processes, forging processes, milling processes, and conventional machining.

In an embodiment of the present invention, 3D printing may be selected from the group consisting of:

3D printing based on material extrusion (e.g., fused deposition modeling (FDM), composite filament fabrication (CFF), or fused filament fabrication (FFF) or fused pellet fabrication or fused particle fabrication);

3D printing based on powder beds, also known as "powder bed fusion" (e.g., powder bed and inkjet head 3D printing (3DP), selective heat sintering (SHS), or selective laser sintering (SLS);

3D printing based on laminated object manufacturing (LOM) (also: sheet lamination);

3D printing based on jetting methods (e.g., material jetting or binder jetting); and 3D printing based on irradiation-based polymerization such as light-based polymerization (e.g., stereolithography (SLA), computed axial lithography, digital light processing (DLP), continuous liquid interface production (CLIP), or directed energy deposition (DED)).

In an embodiment of the present invention, 3D printing is material extrusion (e.g., fused deposition modeling (FDM), composite filament fabrication (CFF), or fused filament fabrication (FFF) or fused pellet fabrication or fused particle fabrication).

In an embodiment of the present invention, 3D printing is such according to WO 2018/132157 including the use of an electrical field applicator at the print head. Such 3D printing based on material extrusion also includes methods such as those including the use of an electrical field applicator at the print head as described in WO 2018/132157. This, in an embodiment of the present invention, 3D printing is such according to WO 2018/132157 including the use of an electrical field applicator at the print head.

As used herein, the term "thermoplastic mass" may be understood in the broadest sense as a polymeric material that becomes pliable, plastic or moldable at an elevated temperature and solidifies upon cooling. Typically, above its glass transition temperature (Tg) and below its melting point, the physical properties of a thermoplastic mass changes significantly without an associated phase change. It typically becomes pliable, plastic or moldable in this temperature range. In the context of the present invention, this temperature range in which the thermoplastic mass has a significantly increased plasticity may be in the range of between 100 and 360° C., between 110 and 350° C., between 120 and 340° C., between 130 and 330° C., between 140 and 320° C., between 145 and 310° C., between 150 and 320° C., between 155 and 310° C., between 160 and 300° C., in the range of between 170 and 290° C., in the range of between 180 and 280° C., in the range of between 190 and 270° C., in the range of between 200 and 260° C., in the range of between 200 and 260° C. Such temperature range may also be used as processing temperature. The terms "mass" and "material" may be used herein interchangeably.

Typically, the components A, B, C, D and E are each different from each other.

In an embodiment of the present invention, the mass usable for 3D printing of the present invention fulfills the requirements of the fire, smoke and toxicity retardant (FST) requirements of industrial norms EN 45545-2 and NFPA 131. As used herein, industrial norms refer to the actual version in September 2019.

In an embodiment of the present invention, the polyamide (PA) component (component A) is the main component of the mass usable for 3D printing, i.e., constitutes to at least 40% by weight of the mass for 3D printing.

As used herein, the term "polyamide" and its abbreviation "PA" may be understood in the broadest sense as any macromolecule with at least four units linked by amide bonds (#—NH—CO—# and/or #—CO—NH—#, respectively, i.e., in the same or different orientation(s), wherein each # is independently a binding site to the rest of the polyamide or, at the end of the polyamide, a capping group)). Typically, a polyamide has more than ten, more than 50, more than 100, more than 500, more than 1000, more than 5000, more than 10000 units linked by amide bonds. Thus, component A may be any polyamide (PA) or copolymer and/or blends of two or more thereof. A polyamide may contain one or more species of aliphatic monomers, one or more species of aromatic monomers, or a combination of two or more thereof (e.g., wherein two or more species of monomers alternate (e.g., as a semi-aromatic wherein aromatic and aliphatic monomers alternate), as a random polymer, as a block polymer, or as a combination of two or more thereof). A polyamide is used herein may be crystalline, partly crystalline or non-crystalline.

Typically, a monomer or a polyamide as used herein has a molecular weight of less than 500 Daltons (Da), often less than 250 Da. An aliphatic monomer may, for instance, contain molecular residues selected from the group consisting of linear alkylene, branched alkylene, cycloalkylene, and combinations of two or more thereof. The aliphatic monomer may or may not be substituted by one or more halogens (e.g., F, Cl, Br; and/or I), alkyloxy groups (e.g., methoxy), amino groups, carboxy group, etc.

A polyamide may be an aliphatic polyamide, a semi-aromatic polyamide (e.g., a polyphthalamide), an aromatic polyamide (aramid) or a blend of two or more thereof. In an embodiment of the present invention, a polyamide is composed of at least 98% by weight, at least 99%, at least 99.9% or 100% by weight of a single type or monomers. In another embodiment of the present invention, a polyamide is composed of at least 98% by weight, at least 99%, at least 99.9% or 100% by weight of two species or monomers. In a still further embodiment of the present invention, a polyamide is composed of at least 98% by weight, at least 99%, at least 99.9% or 100% by weight of at least three species or monomers.

In an embodiment of the present invention, a polyamide is an aliphatic polyamide. In an embodiment of the present invention, a polyamide is an aliphatic polyamide which is composed of at least 98% by weight, at least 99%, at least 99.9% or 100% by weight of a single type or monomers. In another embodiment of the present invention, a polyamide is an aliphatic polyamide which is composed of at least 98% by weight, at least 99%, at least 99.9% or 100% by weight of two species or monomers. In a still further embodiment of the present invention, a polyamide is an aliphatic polyamide which is composed of at least 98% by weight, at least 99%, at least 99.9% or 100% by weight of at least three species or monomers.

In an embodiment of the present invention, a polyamide contains or (essentially) consists of one or more species of monomers selected from the group consisting of:

(a) one or more species of monomeric moieties of the general formula $$\#—NH—R^a—CO—\# \quad (a);$$

(b) a combination of monomeric moieties of one or more species of the general formulae

#—CO—$R^{b1}$—CO—# (b1)

and

#—NH—$R^{b2}$—NH—# (b2); and (c) a combination of species of monomeric moieties of (a) and (b)

wherein:

$R^a$ is selected from the group consisting of a linear or branched $C_1$-$C_{20}$-alkylene, a $C_5$-$C_{10}$-cycloalkylene, a linear or branched $C_1$-$C_{20}$-alkenylene, a $C_5$-$C_{10}$-cycloalkenylene, a $C_6$-$C_{10}$-arylene, a linear or branched $C_1$-$C_{20}$-heteroalkylene, a $C_5$-$C_{10}$-heterocycloalkylene, a linear or branched $C_1$-$C_{20}$-heteroalkenylene, a $C_5$-$C_{10}$-heterocycloalkenylene a $C_6$-$C_{10}$-heteroarylene, and a combination of two or three thereof, wherein $R^a$ may optionally be substituted by one or more halogens, one or more alkyloxy groups, one or more amino groups or one or more carboxy group;

$R^{b1}$ is selected from the group consisting of a linear or branched $C_1$-$C_{20}$-alkylene, a $C_5$-$C_{10}$-cycloalkylene, a linear or branched $C_1$-$C_{20}$-alkenylene, a $C_5$-$C_{10}$-cycloalkenylene, a $C_6$-$C_{10}$-arylene, a linear or branched $C_1$-$C_{20}$-heteroalkylene, a $C_5$-$C_{10}$-heterocycloalkylene, a linear or branched $C_1$-$C_{20}$-heteroalkenylene, a $C_5$-$C_{10}$-heterocycloalkenylene a $C_6$-$C_{10}$-heteroarylene, and a combination of two or three thereof, wherein $R^{b1}$ may optionally be substituted by one or more halogens, one or more alkyloxy groups, one or more amino groups or one or more carboxy group;

$R^{b2}$ is selected from the group consisting of a linear or branched $C_1$-$C_{20}$-alkylene, a $C_5$-$C_{10}$-cycloalkylene, a linear or branched $C_1$-$C_{20}$-alkenylene, a $C_5$-$C_{10}$-cycloalkenylene, a $C_6$-$C_{10}$-arylene, a linear or branched $C_1$-$C_{20}$-heteroalkylene, a $C_5$-$C_{10}$-heterocycloalkylene, a linear or branched $C_1$-$C_{20}$-heteroalkenylene, a $C_5$-$C_{10}$-heterocycloalkenylene a $C_6$-$C_{10}$-heteroarylene, and a combination of two or three thereof, wherein $R^{b2}$ may optionally be substituted by one or more halogens, one or more alkyloxy groups, one or more amino groups or one or more carboxy group; and each # is independently a binding site to the rest of the polyamide or, at the end of the polyamide, a capping group)

In an embodiment of the present invention, in formulae (a), (b1) and (b2):

$R^a$ is selected from the group consisting of a linear or branched $C_1$-$C_{12}$-alkylene, a $C_5$-$C_7$-cycloalkylene, a phenylene, and a combination of two thereof;

$R^{b1}$ is selected from the group consisting of a linear or branched $C_1$-$C_{12}$-alkylene, a $C_5$-$C_7$-cycloalkylene, a phenylene, and a combination of two thereof; and/or $R^{b2}$ is selected from the group consisting of a linear or branched $C_1$-$C_{12}$-alkylene, a $C_5$-$C_7$-cycloalkylene, a phenylene, and a combination of two thereof.

In an embodiment of the present invention, wherein component A is a polyamide (PA) component selected from the group consisting of PA6/6.6 (also: PA6/66), PA6, PA6.6 (also: PA66), PA4.6 (also: PA46), PA6.10 (also PA610), PA12, PA6T/66, PA6T/6, PA6T, PA4T, PA9T, PA10T, high temperature polyamides, copolymers of two or more thereof, and blends of two or more thereof. The polyamide may be newly synthesized or recycled.

In other words, component A may be a polyamide (PA) component selected from the group consisting of polycaprolactam, poly-(N,N'-hexamethylene adipine diamide), poly-(hexamethylene adipamide), poly-(hexamethylene sebacamide), poly-(hexamethylene dodecan diamide) polyundecano-11-lactam, poly-undecano-12-lactam (poly-lauryl lactam), copolymers of two or more thereof, and blends of two or more thereof. In an embodiment of the present invention, component A is a nylon.

As used herein, the term "non-halogenated organic flame retardant" may be understood in the broadest sense as any organic flame retardant that preferably does not contain halogens.

As used herein in the context of compounds, the term "organic" may be understood in the broadest sense as generally understood in the art. Generally, a non-halogenated organic compound contains one or more carbon atoms in covalent bonds and typically contains at least one hydrogen atom and optionally contains one or more heteroatoms. Typically, a non-halogenated organic flame retardant contains at least one heteroatom such as, e.g., one or more phosphorous atoms.

The term "non-halogenated" may be understood interchangeably with "halogen-free" as a compound that does not contain a halogen (i.e., fluorine (F), chlorine (Cl), bromine (Br), iodine (I), astatine (At)). Optionally, a non-halogenated flame retardant may be a phosphinate- and/or nitrogen-based (e.g., based on melamine cyanurate)

Component B may be any non-halogenated organic flame retardant or mixture of two or more non-halogenated organic flame retardants. In an embodiment of the present invention, component B is a phosphinate-based flame retardant. The flame retardant component B is different from the flame retardant of component C.

In an embodiment of the present invention, component B comprises or consists of a dialkylphosphine compound, a diphosphine compound, or a combination thereof. In an embodiment of the present invention, component B comprises or consists of a dialkylphosphinic salt of the formula (I), a diphosphinic salt of the formula (II), or a combination thereof, (I)

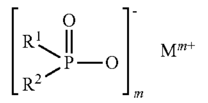

(II)

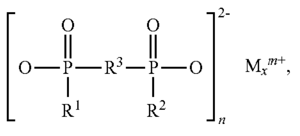

in which $R^1$ and $R^2$ are identical or different and are $C_1$-$C_6$-alkyl, linear or branched or H;

$R^3$ is $C_1$-$C_{10}$-alkylene, linear or branched, $C_6$-$C_{10}$-arylene, $C_7$-$C_{20}$-alkylarylene, or $C_7$-$C_{20}$-arylalkylene;

M is selected from the group consisting of magnesium (Mg), calcium (Ca), aluminum (Al), antimony (Sb), tin (Sn), germanium (Ge), titanium (Ti), zinc (Zn), iron (Fe), zirconium (Zr), cerium (Ce), bismuth (Bi), strontium (Sr), manganese (Mn), lithium (Li), sodium (Na), potassium (K), and a protonated nitrogen base;

m is from 1 to 4;
n is from 1 to 4; and
X is from 1 to 4.

Further examples of such compounds usable as component B are provided in US-A 2018/244899. Still further examples of phosphinate-based flame retardant compounds usable as component B are provided in EP-A 3127937.

In an embodiment of the present invention, component B comprises or consists of a dialkylphosphinic salt of the formula (I). In an alternative embodiment of the present invention, component B comprises or consists of a diphosphinic salt of the formula (II).

In an embodiment of the present invention, in any of formulae (I) or (II), residues $R^1$ and $R^2$ are identical or different and are a linear alkyl selected from the group consisting of ethyl, methyl, n-propyl and n-butyl. In an embodiment of the present invention, in any of formulae (I) or (II), residues $R^1$ and $R^2$ are each ethyl.

In an embodiment of the present invention, in any of formulae (I) or (II), residue M is selected from the group consisting of Al, Mg, Ca, Sb, Sn, and Zn. In an embodiment of the present invention, in any of formulae (I) or (II), residue M is Al. In an embodiment of the present invention, in formula (I), residue m depends on the valency of the metal ion M. When residue M is Al, m may be 3. In an embodiment of the present invention, in formula (II), residues x and n depends on the valency of the metal ion M. In an embodiment of the present invention, component B comprises or consists of a dialkylphosphinic salt of the formula (I), wherein residue M is selected from the group consisting of Al, Mg, Ca, Sb, Sn, and Zn.

In an embodiment of the present invention, component B comprises or consists of a dialkylphosphinic salt of the formula (I), wherein residues $R^1$ and $R^2$ are identical or different and are a linear alkyl selected from the group consisting of ethyl, methyl, n-propyl and n-butyl. In an embodiment of the present invention, in any of formulae (I) or (II), residues $R^1$ and $R^2$ are each ethyl.

In an embodiment of the present invention, component B comprises or consists of a diethylphosphinic (DEP) salt of the formula (I). In an embodiment of the present invention, component B comprises or consists an aluminum salt of diethylphosphinic acid (DEPAL). DEPAL is commercially available from Clariant International Ltd, Switzerland such as, e.g., as Exolit® (e.g., OP 1230).

In an embodiment of the present invention, component B comprises or consists of a dialkylphosphinic salt of the formula (I), wherein residues $R^1$ and $R^2$ are identical or different and are a linear alkyl selected from the group consisting of ethyl, methyl, n-propyl and n-butyl, and residue M is selected from the group consisting of aluminum (Al), magnesium (Mg), calcium (Ca), antimony (Sb), tin (Sn), and zinc (Zn).

For instance, a non-halogenated organic flame retardant may be an organophosphorus compound. Optionally, it may further also contain nitrogen. An organophosphorus compound may, for instance, be a compound based on a phosphase (e.g., based on bisphenol A), triphenyl phosphate (TPP), resorcinol bis(diphenylphosphate) RDP), diphenyl phosphate (BADP) or tricresyl phosphate (TCP); based on a phosphonate (e.g., based on dimethyl methyl phosphonate (DMMP)), or based on a phosphinate (e.g., based on aluminum diethyl phosphinate (e.g., commercially available as Exolit® OP 1230).

In an embodiment of the present invention, component B comprises or consists of a dialkylphosphinic salt of the formula (I), wherein residues $R^1$ and $R^2$ are both ethyl, residue M is Al and m is 3. Thus, in an embodiment of the present invention, the non-halogenated organic flame retardant (used as component B) is aluminum diethyl phosphinate.

Component C may be any particulate inorganic flame retardant or a mixture of two or more thereof. In an embodiment of the present invention, component C is a particulate inorganic flame retardant comprising at least one metal ion selected from the group consisting of zinc, aluminum, calcium, molybdenum, and magnesium. In addition or alternatively, component C may also contain one or more further metals. The flame retardant component C is different from the flame retardant of component B.

As used herein, the term "particulate" may be understood in the broadest sense as a component that is mainly composed of particles. Preferably, such particles are solid particles or essentially solid particles. The particles of the particulate inorganic flame retardant may have any size. In an embodiment of the present invention, the particles of the particulate inorganic flame retardant have a mean particle size (determinable by means of measuring light diffraction, such as according to ISO 13320:2020) $D_{50}$ in the range of 0.1 to 1000 μm, 1 to 500 μm, 2 to 250 μm, 5 to 100 μm, 10 to 50 μm, 20 to 30 μm, 22 to 28 μm, or (approximately 25 μm).

In an embodiment of the present invention, component C is a particulate inorganic flame retardant comprising or composed of an inorganic molybdate, such as, e.g., an inorganic molybdate selected from the group consisting of a basic zinc phosphate complex (e.g., zinc molybdate complex) (e.g., commercially available under the designation Kemgard® from Huber Engineered Materials (e.g., Kemgard® 981), calcium molybdate, ammonium octamolybdate, and zinc molybdate-magnesium silicate.

In an embodiment of the present invention, component C is selected from the group consisting of particulate zinc phosphate complex, Al(OH)O, zinc oxide/phosphate complex, basic zinc phosphate complex (e.g., zinc molybdate complex), calcium zinc molybdate complex, and mixtures of two or more thereof. In an embodiment of the present invention, component C comprises or is a basic zinc phosphate complex (e.g., a zinc molybdate complex). In an embodiment of the present invention, component C comprises or is Al(OH)O (also: AlO(OH)) is also known as boehmite and is commercially available as Actilox® (e.g., Actilox® 200SM) from Nabaltec AG, Germany). In an embodiment of the present invention, component C comprises or is a mixture of a basic zinc phosphate complex (e.g., a zinc molybdate complex) and Al(OH)O.

Component D may be any reinforcing or filler material or a combination of both.

In a preferred embodiment, the component D is or comprises at least one reinforcing material. In a preferred embodiment, a reinforcing material is or comprises at least one fiber material. Then, component D may be any fiber material. Preferably, a fiber material is a reinforcing fiber material that reinforces the mass usable for 3D printing.

In an embodiment of the present invention, component D is a fiber material selected from the group consisting of glass fibers, carbon fibers, aramid fibers, and combinations of two or more thereof. In an embodiment of the present invention, component D is a fiber material, wherein the fibers have a mean length of not more than 100 mm, of not more than 50 mm, of not more than 20 mm, of not more than 10 mm, of not more than 5 mm, of not more than 2 mm, or of not more than 1 mm. In an embodiment of the present invention, component D is a fiber material, wherein the fibers have a mean length of at least 100 nm, of at least 1 μm, of at least 10 μm, of at least 100 μm, or of at least 900 μm. In an embodiment of the present invention, component D is a fiber material, wherein the fibers have a mean diameter in the range of from 0.1 to 100 μm, of from 0.5 to 50 μm, of from 1 to 20 μm, of from 2 to 18 μm, of from 5 to 15 μm, of from 6 to 14 μm, of from 7 to 13 μm, of from 8 to 12 μm, of from 9 to 11 μm, or of from (approximately 10 μm). As used herein, the mean length or diameter of a fiber may be determined via any known technique, such as using an image analyzer of a microphotograph from a scanning electron microscope (SEM), or alternatively via laser diffraction methods (such as static or dynamic light scattering techniques, including according to, e.g. ISO13320:2020).

In an embodiment of the present invention, component D is a fiber material, wherein the fibers have a mean length of not more than 10 mm and a mean diameter in the range of from 1 to 20 μm. In an embodiment of the present invention, component D is a fiber material, wherein the fibers have a mean length of between 1 and 10 mm and a mean diameter in the range of from 5 to 15 μm. In an embodiment of the present invention, component D is a fiber material, wherein the fibers have a mean length of between 2 and 5 mm and a mean diameter in the range of from 7 to 12 μm. In an embodiment of the present invention, component D is a fiber material, wherein the fibers have a mean length of (approximately) 4.5 mm and a mean diameter in the range of from 10 μm.

In an embodiment of the present invention, component D is a fiber material selected from the group consisting of glass fibers, carbon fibers, aramid fibers, and combinations of two or more thereof, wherein the fibers are preferably fibers having a mean length of not more than 10 mm and a mean diameter in the range of from 1 to 20 μm, in particular wherein the fiber material consists of glass fibers having a mean length of not more than 5 mm and a mean diameter in the range of from 5 to 15 μm.

A fiber can optionally also be a continuous (so called "endless" fiber of more than 100 mm length). A fiber may also be included in a tissue, mesh, knitting or the like. In an embodiment of the present invention, component D is a continuous fiber material. In an embodiment of the present invention, component D is a continuous fiber material which is obtainable or obtained from coextruding fibers in the filament continuously.

In an alternative embodiment of the present invention, component D is or comprises one or more fillers. Then, component D may be any filler. For example such filler may be selected from the group consisting of glass beads, one or more non-glass mineral fillers, and combinations thereof. Non-glass mineral fillers may be any of such fillers known in the art, including by not limited to such selected from the group consisting of talc, insulating materials (such as, e.g., boron nitride), and others, and combinations of two or more thereof.

It will be understood that component D may also comprise or consist of a combination of one or more reinforcing materials and one or more fillers.

Accordingly, in an embodiment of the present invention, the thermoplastic mass of component D is:

(a) a reinforcing fiber material, preferably a fiber material selected from the group consisting of glass fibers, carbon fibers, aramid fibers, and combinations of two or more thereof, wherein the fibers are preferably fibers having a mean length of not more than 10 mm and a mean diameter in the range of from 1 to 20 μm, in particular wherein the fiber material consists of glass fibers having a mean length of not more than 5 mm and a mean diameter in the range of from 5 to 15 μm;

(b) a filler material, preferably a filler material selected from the group consisting of glass beads, one or more non-glass mineral fillers, and combinations thereof; or (c) a combination of (a) and (b).

Optionally, the mass usable for 3D printing may contain one or more polymer additives as component E. Such polymer additives may be any polymer additives known in the art. For example, polymer additives may be selected from the group consisting of stabilizers, antioxidants, dyes, pigments, releasing agents, fillers, plasticizers, processing agents, antimicrobial agents, slip agents, antistatics, conductive additives (e.g., metal, carbon, etc.), insulative additives (such as, e.g., boron nitride), anti-dripping agents, further flame retardants, and combinations of two or more thereof. A polymer additive of component E is different from each of components A to D. In particular, a polymer additive of component E is different from a flame retardant of each of components B or C, in other words, is not a flame retardant of component B or C.

In an embodiment of the present invention, the thermoplastic mass comprises, as one component of component E, one or more aromatic di- or tricarboxylic ester/amides, such as, e., N,N'-bis(2,2,6,6-teramethyl-4-piperidyl)-1,3-benzene-dicarboxamide).

In an embodiment of the present invention, the thermoplastic mass comprises, as one component of component E, one or more stabilizers having a CAS number selected from the group consisting of 119345-01-6, 2082-79-3, 6683-19-8, 32509-66-3, 90498-90-1, 40601-76-1, 27676-62-6, 10191-41-0, 10081-67-1, 181314-48-7, 143925-92-2, 31570-04-4, 26741-53-7, 693-36-7, 2500-88-1, 1843-05-6, 25973-55-1, 05.11.3896, 147-75-9, 3864-99-1, 2440-22-4, 155633-54-8, 70321-86-7, 2725-22-6, 147315-50-2, 14516-71-3, 2403-88-5411, 52829-07-9, 167078-06-0 (24860-22-8), 124172-53-8, 65447-77-0, 71878-19-8 (und 70624-18-9), 82451-48-7, and 106990-43-6.

In an embodiment of the present invention, the thermoplastic mass comprises, as component E, one or more copper-based stabilizers such as, e.g., such selected from the group consisting of one or more cupric fatty acids (e.g., cupric stearate) and one or more copper halide (e.g., copper iodide and/or copper bromide), optionally in combination with a metal sulfonate as described in EP-B 2271710. For example, such stabilizers may be obtained as commercial products such as, e.g., as Bruggolen H320.

In an embodiment of the present invention, the thermoplastic mass comprises, as one component of component E, tetrakis(2,4-di-tert-butylphenyl)-4,4-biphenyldiphosphonite.

In one embodiment, component E may comprise:

0 to 20% by weight or 0 to 2% by weight, based on the total amount of the thermoplastic mass, of a salt of phosphorous acid;

0 to 2% by weight or 0.1 to 2% by weight, based on the total amount of the thermoplastic mass, of a carboxylic ester amide;

0 to 1% by weight or 0.1 to 1% by weight, based on the total amount of the thermoplastic mass, of a phosphonite or of a mixture of a phosphonite and a phosphite; and/or 0 to 1% by weight or 0.1 to 1% by weight, based on the total amount of the thermoplastic mass, of an ester or salt of long-chain aliphatic carboxylic acids (fatty acids) having chain lengths of from $C_{14}$ to $C_{40}$.

In an embodiment of the present invention, the thermoplastic mass comprises, as component E:

at least one aromatic di- or tricarboxylic ester/amide, in particular N,N'-bis(2,2,6,6-teramethyl-4-piperidyl)-1,3-benzenedicarboxamide), and at least one stabilizer having a CAS number selected from the group consisting of 119345-01-6, 2082-79-3, 6683-19-8, 32509-66-3, 90498-90-1, 40601-76-1, 27676-62-6, 10191-41-0, 10081-67-1, 181314-48-7, 143925-92-2, 31570-04-4, 26741-53-7, 693-36-7, 2500-88-1, 1843-05-6, 25973-55-1, 05.11.3896, 147-75-9, 3864-99-1, 2440-22-4, 155633-54-8, 70321-86-7, 2725-22-6, 147315-50-2, 14516-71-3, 2403-88-5411, 52829-07-9, 167078-06-0 (24860-22-8), 124172-53-8, 65447-77-0, 71878-19-8 (und 70624-18-9), 82451-48-7, and 106990-43-6, in particular tetrakis(2,4-di-tert-butylphenyl)-4,4-biphenyldiphosphonite.

In an embodiment of the present invention, the thermoplastic mass comprises, as one component of component E, an anti-dripping agent. An anti-dripping agent may comprise or consist of silica particles and/or polytetrafluoroethylene (PTFE) as commercially available as Teflon. An anti-dripping agent of component E is different from a flame retardant of each of components B or C, in other words, is not a flame retardant of component B or C.

In an embodiment of the present invention, the thermoplastic mass comprises, as one component of component E, a further flame retardant. Such additional flame retardant of component E is different from a flame retardant of each of components B or C, in other words, is not a flame retardant of component B or C. Such additional flame retardant of component E is, thus, neither a non-halogenated organic flame retardant (component B) nor a particulate inorganic flame retardant (component C). In an embodiment of the present invention, an additional flame retardant of component E is a halogenated organic flame retardant or a non-particulate inorganic flame retardant. Such additional flame retardant may also be a halogenated flame retardant (e.g., polytetrafluoroethylene-based (PTFE-based) as commercially available as Teflon).

Further examples of compounds usable as polymer additives of component E are provided in EP-A 3127937 and US-A 2018/244899.

The components A-D and, if present component E, may be present in any content ratio. In an embodiment, one or more polyamides of component A are the main component of the mass usable for 3D printing. Thus, preferably component A constitutes for at least 50% by weight of the mass usable for 3D printing.

In an embodiment of the present invention, the thermoplastic mass comprises 38.9 to 98.9% by weight of component A, 38.9 to 80% by weight of component A, 40 to 80% by weight of component A, 50 to 80% by weight of component A, 55 to 80% by weight of component A, or 55 to 60% by weight of component A.

In an embodiment of the present invention, the thermoplastic mass comprises 1 to 30% by weight of component B, 1 to 30% by weight of component B, 10 to 20% by weight of component B, or 12 to 19% by weight of component B.

In an embodiment of the present invention, the thermoplastic mass comprises 0.01 to 40% by weight of component C, 0.1 to 35% by weight of component C, 0.1 to 25% by weight of component C, 1 to 10% by weight of component C, 10 to 40% by weight of component C, 20 to 35% by weight of component C, 25 to 30% by weight of component C, 1 to 10% by weight of component C, 1.2 to 32% by weight of component C, 28 to 32% by weight of component C, or 1.2 to 8% by weight of component C.

In an embodiment of the present invention, the thermoplastic mass comprises 0 to 60% by weight of component D, 1 to 58% by weight of component D, 5 to 30% by weight of component D, 10 to 25% by weight of component D, or 15 to 22% by weight of component D.

In an embodiment of the present invention, the thermoplastic mass comprises 0 to 5% by weight of component E, 0 to 2% by weight of component E, 0 to 1% by weight of component E, 0.1 to 1% by weight of component E, 0.2 to 0.8% by weight of component E, 0.3 to 0.7% by weight of component E, or 0.4 to 0.6% by weight of component E.

For example, component E may contain or consist of:

0 to 2% by weight, 0.01 to 1% by weight, 0.05 to 1% by weight, 0.1 to 0.8% by weight, 0.15 to 0.7% by weight, or 0.2 to 0.6% by weight of one or more processing stabilizers such as, e.g., Hostanox P-EPQ, and 0 to 2% by weight, 0.01 to 1% by weight, 0.05 to 1% by weight, 0.1 to 0.8% by weight, 0.15 to 0.7% by weight, or 0.2 to 0.6% by weight of one or more modifiers and stabilizers such as, e.g., Nylostab S-EED; and optionally 0 to 2% by weight, 0.01 to 1% by weight, 0.05 to 1% by weight, 0.1 to 0.8% by weight, 0.15 to 0.7% by weight, or 0.2 to 0.6% by weight of one or more dyes.

In an embodiment of the present invention, the thermoplastic mass comprises or consists of:

(A) 38.9 to 98.9% by weight of component A;
(B) 1 to 30% by weight of component B;
(C) 0.01 to 35% by weight of component C;
(D) 0 to 60% by weight of component D; and
(E) 0 to 20% by weight of component E.

In an embodiment of the present invention, the thermoplastic mass comprises or consists of:

(A) 38.9 to 98.9% by weight of component A;
(B) 1 to 30% by weight of component B;
(C) 0.01 to 35% by weight of component C;
(D) 0 to 60% by weight of component D; and
(E) 0 to 5% by weight of component E.

It will be understood that the percentage ranges are each based on the total mass of the thermoplastic mass. In an embodiment of the present invention, throughout the present invention, the contents of the components A-D and, if present E, sum up to 100%. Then, the thermoplastic mass may consist of such ingredients.

In an embodiment of the present invention, the thermoplastic mass comprises or consists of:

(A) 50 to 80% by weight of component A;
(B) 1 to 30% by weight of component B;
(C) 0.1 to 35% by weight of component C;
(D) 0 to 60% by weight of component D; and
(E) 0 to 2% by weight of component E.

In an embodiment of the present invention, the thermoplastic mass comprises or consists of:

(A) 50 to 80% by weight of component A;
(B) 1 to 30% by weight of component B;
(C) 0.1 to 35% by weight of component C;
(D) 0.1 to 60% by weight of component D; and
(E) 0 to 2% by weight of component E.

In an embodiment of the present invention, the thermoplastic mass comprises or consists of:

(A) 44.9 to 78.9% by weight of component A;
(B) 10 to 20% by weight of component B;
(C) 1 to 35% by weight of component C;
(D) 10 to 25% by weight of component D; and
(E) 0.1 to 1% by weight of component E.

In an embodiment of the present invention, the thermoplastic mass comprises or consists of:

40 to 60% by weight of component A;
12 to 19% by weight of component B;
1.2 to 32% by weight of component C;

15 to 22% by weight of component D; and 0.1 to 1% by weight of component E

In an embodiment of the present invention, the thermoplastic mass comprises or consists of:

55 to 60% by weight of component A;

12 to 19% by weight of component B;

1.2 to 8% by weight of component C;

15 to 22% by weight of component D; and 0.1 to 1% by weight of component E

In a preferred embodiment, the thermoplastic mass comprises or consists of:

(A) 55 to 78.9% by weight of at least one polyamide (PA) component selected from the group consisting of PA6/6.6 (also: PA6/66), PA6, PA6.6 (also: PA66), PA4.6 (also: PA46), PA6.10 (also PA610), PA12, PA6T/66, PA6T/6, PA6T, PA4T, PA9T, PA10T, high temperature polyamides, copolymers of two or more thereof, and blends of two or more thereof;

(B) 10 to 20% by weight of at least one phosphinate-based flame retardant, in particular aluminum diethyl phosphinate;

(C) 1 to 10% by weight of at least one particulate inorganic flame retardant comprising at least one metal ion selected from the group consisting of zinc, aluminum, calcium, molybdenum, and magnesium, in particular is selected from the group consisting of particulate zinc phosphate complex, Al(OH)O, zinc oxide/phosphate complex, a basic zinc phosphate complex (e.g., zinc molybdate complex), calcium zinc molybdate complex, and mixtures of two or more thereof;

(D) 10 to 25% by weight of at least one reinforcing or filler material, in particular wherein the material is a fiber material selected from the group consisting of glass fibers, carbon fibers, aramid fibers, and combinations of two or more thereof, wherein the fibers are preferably fibers having a mean length of not more than 10 mm and a mean diameter in the range of from 1 to 20 μm;

(E) 0.1 to 1% by weight of at least one polymer additives selected from the group consisting of consisting of stabilizers, antioxidants, dyes, pigments, releasing agents, fillers, plasticizers, processing agents, antimicrobial agents, slip agents, antistatics, conductive additives (e.g., metal, carbon, etc.), insulative additives, anti-dripping agents, further flame retardants, and combinations of two or more thereof, in particular containing at least one aromatic di- or tricarboxylic ester/amide and/or one or more stabilizers.

The mass usable for 3D printing of the present invention may be provided in any form. It may be provided as a 3D printing filament, a powder usable for powder bed fusion 3D printing, as a granulate, a s a melt or in any other form.

Accordingly, a further aspect of the present invention relates to a 3D printing filament comprising or (essentially) consisting of a thermoplastic mass of the present invention.

It will be understood that all descriptions and embodiments as described above in the context of the mass as such also mutatis mutandis apply to 3D printing filament.

Such 3D printing filament may have any diameter. The diameter depends on the 3D printing device it is intended to be used with. In an embodiment of the present invention, the 3D printing filament has a diameter in the range of from 0.5 to 5 mm. Such 3D printing filament may have any length. Preferably, it is more than 1 m in length, more preferably more than 2 m, more than 5 m, more than 10 m, more than 20 m, more than 50 m, more than 20 m, or even more than 100 m in length.

Another aspect of the present invention relates to a powder for powder bed fusion 3D printing comprising or (essentially) consisting of a thermoplastic mass of the present invention.

It will be understood that all descriptions and embodiments as described above in the context of the mass as such also mutatis mutandis apply to the powder for powder bed fusion 3D printing.

Such powder may have any properties suitable for this purpose. The size and shape of the powder also depends on the 3D printing device it is intended to be used with. In an embodiment of the present invention, the powder has a mean diameter of less than 5 mm, less than 2 mm or less than 1 mm.

As noted above, the mass of the present invention may be used for 3D printing. Accordingly, a further aspect of the present invention relates to the use of a thermoplastic mass of the present invention for 3D printing.

It will be understood that all descriptions and embodiments as described above in the context of the mass as such also mutatis mutandis apply to the use of the thermoplastic mass of the present invention for 3D printing.

Accordingly, the present invention also refers to the use of a 3D printing filament of the present invention (e.g., such having a diameter in the range of from 0.5 to 5 mm) for 3D printing (e.g., any extrusion-based 3D printing as described herein). The present invention further refers to the use of a powder for powder bed fusion 3D printing of the present invention for 3D printing (e.g., powder bed fusion 3D printing).

The present invention also refers to a method of preparing a three-dimensionally shaped product by means of 3D printing. Herein, preferably a small portion of the mass is heated until it is at least plastic (optionally (partly) melted) and thereby, layer-wise, a product is prepared while the mass is cooled and thereby solidifies again.

A further aspect of the present invention relates to a method of preparing a three-dimensionally shaped product by means of 3D printing, said method comprising the steps of:

(i) providing a thermoplastic mass of the present invention;

(ii) heating defined parts of the thermoplastic mass of step (i) above the glass transition temperature to obtain a plastic mass;

(iii) preparing the three-dimensionally shaped product from the plastic mass of step (ii); and (iv) cooling the heated thermoplastic mass of step (iii) to obtain a solid product.

It will be understood that all descriptions and embodiments as described above in the context of the mass as such, the 3D printing filament and the powder for powder bed fusion 3D printing and the use of the mass also mutatis mutandis apply to the method of preparing a three-dimensionally shaped product by means of 3D printing.

Step (ii) may include heating to a temperature in the range of between 180 and 265° C., between 190 and 260° C., between 200 and 255° C., between 210 and 250° C., between 220 and 245° C., between 230 and 245° C., or (approximately) 240° C. These temperatures may also be used as nozzle temperatures. These may be adapted for specific polyamides and polyamide blends such as, e.g., PA6/66.

Step (ii) may include using heating chamber conditions of 25 to 250° C., of 30 to 200° C., of 30 to 150° C., of 40 to 120° C., of 50 to 100° C., of 60 to 100° C., or of 70 to 90° C.

Step (ii) may include heating the 3D printer build plate to a temperature above or below the glass transition temperature of the polymer to ensure adhesion and ideal properties to maintain adhesion to the plate. Additional methods to ensure adhesion of the polymer to the build plate can include use of a vacuum type build plate or specific build plate adhesives such as polyvinyl alcohol (PVA), polyvinylpyrrolidone (PVP) or one or more other chemical based adhesives/glues or combinations of two or more thereof. Adhesion may optionally occur around the glass adhesion temperature, alternatively below or above the glass adhesion temperature.

In steps (iii) and (iv), the temperature may be decreased to any temperature below the the glass transition temperature such as e.g., to a temperature in the range between room temperature (i.e., (approximately) 20° C.) and 120° C., between 20° C. and 110° C., between 30° C. and 90° C., between 40° C. and 100° C., between 60° C. and 100° C., between 70° C. and 90° C., or (approximately) 80° C. Such temperature may be a print bed temperature. It will be understood that finally the product may be decreased to room temperature (i.e., (approximately) 20° C.) or a temperature below room temperature.

The method of preparing a three-dimensionally shaped product may be conducted by any means. For instance, it may be a 3D printing method selected from the group consisting of:

3D printing based on material extrusion (e.g., fused deposition modeling (FDM), composite filament fabrication (CFF), or fused filament fabrication (FFF) or fused pellet fabrication or fused particle fabrication);

3D printing based on powder beds, also known as "powder bed fusion" (e.g., powder bed and inkjet head 3D printing (3DP), selective heat sintering (SHS), or selective laser sintering (SLS);

3D printing based on laminated object manufacturing (LOM) (also: sheet lamination);

3D printing based on jetting methods (e.g., material jetting or binder jetting); and 3D printing based on irradiation-based polymerization such as light-based polymerization (e.g., stereolithography (SLA), computed axial lithography, digital light processing (DLP), continuous liquid interface production (CLIP), or directed energy deposition (DED)).

In an embodiment of the present invention, the method comprises the steps of:

(i) providing a 3D printing filament of the present invention;
(ii) extruding and thereby heating the 3D printing filament to obtain a plastic mass at the outlet die of the extruder;
(iii) adding the plastic mass from the outlet die of the extruder to the desired three-dimensionally shape of the product;
(iv) cooling the heated thermoplastic mass of step (iii) to obtain a part of the solid product; and
(v) continuing steps (i) to (iv) until the three-dimensionally shaped product is obtained.

Extrusion of procedural step (ii) may be conducted by any means. For instance, such method may be fused deposition modeling (FDM), composite filament fabrication (CFF), or fused filament fabrication (FFF) or fused pellet fabrication, or fused particle fabrication).

In another embodiment of the present invention, the method comprises the steps of:

(i) providing powder for powder bed fusion 3D printing of the present invention and contacting it with a solid carrier;
(ii) heating selective parts of the powder contacted with a solid surface of step (i) to obtain a plastic mass in the desired three-dimensional shape of the product, preferably wherein heating is performed by means of light irradiation applied to the desired shape, in particular by means of a laser beam or light irradiation that is applied selectively through selected openings of an irradiation-impermeable mask;
(iii) allowing the plastic mass to adhere to material it has contact with;
(iv) cooling the heated thermoplastic mass of step (iii) to obtain a part of the solid product; and
(v) continuing steps (i) to (iv) until the three-dimensionally shaped product is obtained.

For instance, such method may be 3D printing based on powder beds, also known as "powder bed fusion". It may be selected from the group consisting of powder bed and inkjet head 3D printing (3DP), selective heat sintering (SHS), and selective laser sintering (SLS).

As used herein, the term "essentially consisting of" may be understood as being composed of the respective contents and optionally minor amounts (i.e., traces) of one or more further ingredients. Typically, "essentially consisting of" means that the respective composition is composed of at least 95% by weight, at least 98% by weight, at least 99% by weight, at least 99.5% by weight, at least 99.8% by weight, or at least 99.9% by weight of the designated ingredients and optionally further ingredients which do not (significantly) influence the properties of the composition. Such further ingredient may, for example, be traces of water, traces of one or more salts and/or, traces of one or more impurities of the ingredients.

Further embodiments of the present invention are provided in the examples and claims. The experimental examples are intended to illustrate the invention further, but do not limit the scope of the claims.

EXAMPLES

1.) Components Used for Preparing Flame Retardant Polyamide Compositions

The following components were used:

A commercially available polyamide (as component A): polyamide 6/66 (PA6/66, also PA6/6.6);

Flame retardant (as component B): aluminum salt of diethylphosphinic acid, hereinafter called DEPAL (Clariant International Ltd, Switzerland);

Flame retardant (as component C-1): a basic zinc phosphate complex (Kemgard® 981, Huber Engineered Materials, USA);

Flame retardant (as component C-2): boehmite (Actilox® 200SM, Nabaltec AG, Germany);

Glass fibers (as component D): ECS301 (HP-3-M4) glass fibers, 10 μm diameter, 4.5 mm length (Chongqing Polycomp International Corporation, China);

Stabilizer (as component E-1): Nylostab® S-EED® (Clariant International Ltd, Switzerland);

Stabilizer (as component E-2): Hostanox® P-EPQ® (Clariant International Ltd, Switzerland); and optionally a color masterbatch could be added (as component E-3): A mixture of polyamide 6, one or more additives, and one or more colorants/dyes.

2. Production, Processing and Testing of Flame Retardant Polyamide 3D Printed Compositions The flame retardants (components B and C and other ingredients were mixed in the ratio stated in Table 1 by first pre-mixing pellets and powders using standard mixing devices (powder with powder, pellets with pellets). Once ingredients of the same form were mixed, they were further incorporated together by way of the main and side feeding of a twin-screw extruder (Leistritz ZSE 27 iMAXX 48D) at temperatures from 200 to 250° C. into polyamide 6/66 (component A). Glass fibers (component D) were added via a side feeder at a further down position in the barrel of the extruder. The homogenized glass fiber (GF-)reinforced polymer filament was extruded via a heated die of appropriate size for the intended filament diameter and cooled in successive temperature-controlled water baths. The polymer strand was pulled through the die via a rotating pulling device and measured just before this device for diameter using a 3-axis laser measurement device. Diameter was maintained at tolerances of at least +/−0.05 mm of the target diameter. Filament was further wound onto spools to allow printing in an extrusion type 3D printer.

Following winding onto spools, the filament was dried at 80° C. in a vacuum oven until desired moisture levels were achieved (approximately 2 to 14 hours). Filament was then packaged with an appropriately sized desiccant inside a plastic bag and vacuum sealed to prevent exposure to moisture.

Filament compositions were tested in an extrusion type 3D printer (Ultimaker S5 equipped with an aftermarket top cover) using an appropriate glass print bed surface coated with an adhesive to allow the first layer to adhere properly to the glass print bed (e.g. PVP based glue or commercially available polyamide targeted print adhesives). The filament was extruded at temperatures from 220 to 250° C. and shaped into test specimens including those for the UL 94, NFPA 130 (ASTM E162-15b, ASTM E662-17), SMP 800c, and EN 45545-2 (ISO 4589-2, ISO 5659-2).

All the 3D printed specimens were produced under conditions that allowed for the best printed specimen with the specific composition (print temperatures of approximately 240° C.). In some cases, slight variations in print temperature and speed were employed. The print bed temperature was maintained at 80° C.

Examples IE1 and IE2 were prepared as defined in Table 1. All quantities are defined as % by weight and are based on the 3D printed compositions inclusive of the flame retardants, additives and reinforcing materials.

TABLE 1

Experimentally used compositions and their properties

| Component | | IE1 | IE2 |
|---|---|---|---|
| A | polyamide 6/66 | 59.4 | 59.4 |
| B | DEPAL (Exolit OP 1400) | 18.5 | 13 |
| C-1 | Kemgard 981 | 1.5 | — |
| C-2 | Actilox 200SM | — | 7 |
| D | ECS301-HP-3-M4 glass fibers | 20 | 20 |
| E-1 | Nylostab S-EED | 0.5 | 0.5 |
| E-2 | Hostanox P-EPQ | 0.1 | 0.1 |
| Properties | Surface Flammability $I_s$ (ASTM E162-15b) | 18 | 8 |
| | Specific Optical Density of Smoke Flaming Exposure $D_s$ at 4.0 s (ASTM E662-17) | 162.8 | 94.0 |

The polyamide 6/66 (PA6/66-GF20) composition lacking the other ingredients had a higher mass density and, in particular a considerably higher specific optical density of smoke flaming exposure $D_s$ at 4.0 s (ASTM E662-17). IE1 and IE2 were both off white to beige. The mass density of IE2 is 1293 kg/m$^3$ and its melting temperature is 195° C. In comparison, a glass fiber-reinforced. IE1 and IE2 were both found reasonably usable in 3D printability processes and resulted in desirable surfaces. In particular IE2 was printed nicely and resulted in a very smooth surface for a glass fiber reinforced 3D printer extrusion material.

Accordingly, combinations of polyamide, glass fibers, DEPAL and stabilizers resulted in polyamide 3D printing compositions which achieve the NFPA 130 requirements for surface flammability ($I_s$≤35, ideally≤25) and density of smoke ($D_s$≤200 ideally≤165).

Toxicity tests were further carried out, specifically the Bombardier SMP 800-c toxicity test and the standard for NFPA 130. The results are depicted in Table 2 and 3 below.

TABLE 2

Generation of toxic compounds upon experiments in flaming mode.

| | IE1 | IE2 |
|---|---|---|
| Carbon Monoxide at 1.5 min (ppm) | 50 | 136 |
| Carbon Monoxide at 4 min (ppm) | 195 | 427 |
| Carbon Monoxide at maximum (ppm) | 2062 | 2497 |
| Carbon Dioxide at 1.5 min (ppm) | 871 | 1243 |
| Carbon Dioxide at 4 min (ppm) | 2320 | 2859 |
| Carbon Dioxide at maximum (ppm) | 10100 | 9871 |
| Nitrogen Dioxide (ppm) | <20 | <20 |
| Sulfur Dioxide (ppm) | <20 | <20 |
| Hydrogen Chloride (ppm) | <20 | <20 |
| Hydrogen Fluoride (ppm) | <20 | <20 |
| Hydrogen Bromide (ppm) | <20 | <20 |
| Hydrogen Cyanide (ppm) | <20 | <20 |

TABLE 3

Generation of toxic compounds upon experiments in non-flaming mode.

| | IE1 | IE2 |
|---|---|---|
| Carbon Monoxide at 1.5 min (ppm) | <20 | <20 |
| Carbon Monoxide at 4 min (ppm) | <20 | <20 |
| Carbon Monoxide at maximum (ppm) | 57 | 51 |
| Carbon Dioxide at 1.5 min (ppm) | 490 | 477 |
| Carbon Dioxide at 4 min (ppm) | 506 | 512 |
| Carbon Dioxide at maximum (ppm) | 609 | 592 |
| Nitrogen Dioxide (ppm) | <20 | <20 |
| Sulfur Dioxide (ppm) | <20 | <20 |
| Hydrogen Chloride (ppm) | <20 | <20 |
| Hydrogen Fluoride (ppm) | <20 | <20 |
| Hydrogen Bromide (ppm) | <20 | <20 |
| Hydrogen Cyanide (ppm) | <20 | <20 |

Accordingly, combinations of polyamide, glass fibers, DEPAL and stabilizers give polyamide 3D printing compositions which achieve the NFPA 130 requirements for toxicity.

Additional tests were carried out on IE2 following the EN 45545-2 requirements. 4 mm thick 3D printed specimens were prepared and tested. The results are depicted in Table 4 below.

TABLE 4

Further properties of IE2

| | |
|---|---|
| Oxygen index (ISO 4589-2) (%) | 33.6 |
| Smoke emission maximum $D_s$ (max) 25 kW/m$^2$ (ISO 5659-2) | 111.1 |
| Smoke emission $D_s$ 25 kW/m$^2$ (4 minutes) | 21.3 |

TABLE 4-continued

| Further properties of IE2 | |
|---|---|
| VOF4 (cumulative value of specific optical densities in the first 4 min of the test) | 19.5 |
| Conventional toxicity index ($C/T_{NLP}$) 600° C. (NF X 70-100-1, NF X 70-100-2) | 0.51 |

Accordingly, the combinations of polyamide, glass fibers, DEPAL and stabilizers of IE2 result in a polyamide 3D printing composition which achieves hazard levels of HL1, HL2 and HL3 for the R22 requirement of EN 45545-2.

In summary, a thermoplastic mass usable for 3D printing of the present invention is highly beneficial, provides good printing properties, good physicochemical properties, good flame retardancy and unexpectedly low specific optical density of smoke flaming exposure. Thus, the thermoplastic mass of the present invention is particularly well usable for 3D printing.

What is claimed is:

1. A thermoplastic mass usable for 3D printing comprising:

(A) 55 to 80% by weight of component A;

(B) 13% by weight of component B;

(C) 7% by weight of component C;

(D) 10 to 25% by weight of component D; and (E) 0.1 to 1% by weight of component E;

wherein component A comprises a polyamide;

wherein component B comprises a non-halogenated organic flame retardant selected from the group consisting of a dialkylphosphinic salt of the formula (I), a diphosphinic salt of the formula (II), or a combination thereof, (I)

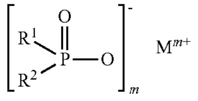

(II)

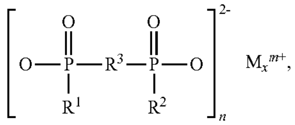

in which $R^1$ and $R^2$ are identical or different and are $C_1$-$C_6$-alkyl, linear or branched or H; $R^3$ is $C_1$-$C_{10}$-alkylene, linear or branched, $C_6$-$C_{10}$-arylene, $C_7$-$C_{20}$-alkylarylene, or $C_7$-$C_{20}$-arylalkylene;

M is selected from the group consisting of Sb, Sn, Ge, Fe, Zr, Ce, Bi, Sr, Mn, Li, Na, K, and a protonated nitrogen base;

m is from 1 to 4;

n is from 1 to 4; and x is from 1 to 4;

wherein component C comprises a particulate inorganic flame retardant selected from the group consisting of particulate zinc phosphate complex, Al(OH)O, zinc oxide/phosphate complex, basic zinc phosphate complex, calcium zinc molybdate complex, and mixtures of two or more thereof;

wherein component D comprises a reinforcing or filler material;

wherein component E comprises at least one aromatic di- or tricarboxylic ester/amide; and at least one stabilizer having a CAS number selected from the group consisting of 119345-01-6, 2082-79-3, 6683-19-8, 32509-66-3, 90498-90-1, 40601-76-1, 27676-62-6, 10191-41-0, 10081-67-1, 181314-48-7, 143925-92-2, 31570-04-4, 26741-53-7, 693-36-7, 2500-88-1, 1843-05-6, 25973-55-1, 05.11.3896, 147-75-9, 3864-99-1, 2440-22-4, 155633-54-8, 70321-86-7, 2725-22-6, 147315-50-2, 14516-71-3, 2403-88-5411, 52829-07-9, 167078-06-0 (24860-22-8), 124172-53-8, 65447-77-0, 71878-19-8 (70624-18-9), 82451-48-7, 106990-43-6, and combinations thereof;

wherein the thermoplastic mass is in the form of a spooled filament used for 3D printing;

wherein the thermoplastic mass has a surface flammability ≤25 and not less than 8; and wherein the thermoplastic mass has a specific optical density ≤165 and not less than 94.

2. The thermoplastic mass of claim 1, wherein component A comprises PA6/6.6, PA6, PA6.6, PA4.6, PA12, PA6.10, PA6T/66, PA6T/6, PA6T, PA4T, PAST, PA10T, copolymers of two or more thereof, or blends of two or more thereof.

3. The thermoplastic mass of claim 2, wherein component A is recycled.

4. The thermoplastic mass of claim 1, wherein component C comprises Al(OH)O.

5. The thermoplastic mass of claim 1, wherein component D comprises:

(a) a reinforcing fiber material;

(b) a filler material; or (c) a combination of (a) and (b).

6. The thermoplastic mass of claim 5, wherein the reinforcing fiber material possesses a mean fiber length and/or a mean fiber diameter, wherein the mean fiber length is less than or equal to 10 mm; and/or the mean fiber diameter is from 1 to 20 μm.

7. The thermoplastic mass of claim 1, comprising:

(A) 59.4% by weight of component A;

(B) 13% by weight of component B;

(C) 7% by weight of component C;

(D) 20% by weight of component D; and (E) 0.6% by weight of component E.

8. The thermoplastic mass of claim 1, comprising:

(A) 55 to 78.9% by weight of at least one polyamide (PA) component selected from the group consisting of PA6/6.6, PA6, PA6.6, PA4.6, PA12, PA6.10, PA6T/66, PA6T/6, PA6T, PA4T, PAST, PA10T, copolymers of two or more thereof, and blends of two or more thereof;

(B) 13% by weight of at least one phosphinate-based flame retardant selected from the group consisting of a dialkylphosphinic salt of the formula (I), a diphosphinic salt of the formula (II), or a combination thereof, (I)

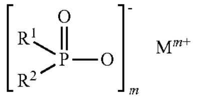

(II)

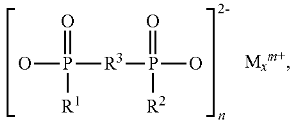

in which $R^1$ and $R^2$ are identical or different and are $C_1$-$C_6$-alkyl, linear or branched or H; $R^3$ is $C_1$-$C_{10}$-alkylene, linear or branched, $C_6$-$C_{10}$-arylene, $C_7$-$C_{20}$-alkylarylene, or $C_7$-$C_{20}$-arylalkylene;

M is selected from the group consisting of Sb, Sn, Ge, Fe, Zr, Ce, Bi, Sr, Mn, Li, Na, K, and a protonated nitrogen base;

m is from 1 to 4;

n is from 1 to 4; and x is from 1 to 4;

(C) 7% by weight of the particulate inorganic flame retardant;

(D) 10 to 25% by weight of at least one reinforcing or filler material; and (E) 0.1 to 1% by weight of at least one aromatic di- or tricarboxylic ester/amide; and at least one stabilizer having a CAS number selected from the group consisting of 119345-01-6, 2082-79-3, 6683-19-8, 32509-66-3, 90498-90-1, 40601-76-1, 27676-62-6, 10191-41-0, 10081-67-1, 181314-48-7, 143925-92-2, 31570-04-4, 26741-53-7, 693-36-7, 2500-88-1, 1843-05-6, 25973-55-1, 05.11.3896, 147-75-9, 3864-99-1, 2440-22-4, 155633-54-8, 70321-86-7, 2725-22-6, 147315-50-2, 14516-71-3, 2403-88-5411, 52829 07-9, 167078-06-0 (24860-22-8), 124172-53-8, 65447-77-0, 71878-19-8 (70624-18-9), 82451-48-7, 106990-43-6, and combinations thereof.

9. A 3D printing filament comprising a thermoplastic mass of claim 1, wherein the 3D printing filament has a diameter in the range of from 0.5 to 5 mm.

10. A method of preparing a three-dimensionally shaped product by means of 3D printing, said method comprising the steps of:

(i) providing the thermoplastic mass of claim 1;

(ii) heating defined parts of the thermoplastic mass of step (i) above the glass transition temperature to obtain a plastic mass;

(iii) preparing the three-dimensionally shaped product from the plastic mass of step (iii) (ii); and (iv) cooling the plastic mass of step (iii) to obtain a solid product.

11. A method of preparing a three-dimensionally shaped product by means of 3D printing, comprising the steps of:

(i) providing the thermoplastic mass of claim 1;

(ii) extruding and thereby heating the filament to obtain a plastic mass at an outlet die of the extruder;

(iii) adding the plastic mass from the outlet die of the extruder to the desired three-dimensional shape of the product;

(iv) cooling the plastic mass of step (iii) to obtain a solid part of the product; and (v) continuing steps (i) to (iv) until the three-dimensionally shaped product is obtained.

* * * * *